United States Patent [19]

Röhm

[11] 3,814,451

[45] June 4, 1974

[54] MULTIPLE-JAW-CHUCK

[76] Inventor: Günter Horst Röhm, 7927 Sontheim/Brenz, Germany

[22] Filed: Aug. 7, 1972

[21] Appl. No.: 278,622

[30] Foreign Application Priority Data

Aug. 7, 1971 Germany .......................... 2139718

[52] U.S. Cl. .............................................. 279/121

[51] Int. Cl. .......................................... B23b 31/16

[58] Field of Search ...................... 279/121, 110, 70

[56] References Cited

UNITED STATES PATENTS

| | | | |
|---|---|---|---|
| 1,786,147 | 12/1930 | Bullard | 279/121 |
| 2,954,983 | 10/1960 | Roby | 279/121 |

*Primary Examiner*—Gil Weidenfeld

*Attorney, Agent, or Firm*—Karl F. Ross; Herbert Dubno

[57] ABSTRACT

A three-jaw chuck has a body rotatable about an axis and three jaw supports received in radially extending slots in one of its faces. Three drivers are slidable in bores extending axially in the chuck body and terminate in respective camming heads with sloping inner and outer surfaces received in similarly inclined recesses of the associated jaw supports. A control sleeve positively coupled with all the drivers can be axially displaced to move the jaw supports radially in or out. Each driver and each jaw support has a pair of laterally extending ribs or wings which are slidable in pairs of orthogonally adjoining grooves or flutes formed in the chuck body.

8 Claims, 3 Drawing Figures

II III 1 14 5 18 17 2 23 26 16 22 21 6' 4 18' 30 15 32 3 A 7 12 10 8 11 33 9 13 6 1 31 II

MULTIPLE-JAW-CHUCK

FIELD OF THE INVENTION

My present invention relates to a multiple-jaw chuck, more specifically to a three-jaw chuck of the universal or self-centering type used in machining operations.

BACKGROUND OF THE INVENTION

Such a chuck generally has a body rotatable about an axis and three gripper jaws, integral with or detachably secured to respective supports, which are radially slidable across a working face of the body to hold and center a tool or a workpiece. This body is usually carried on the headstock of a lathe, drill press, shaper or similar piece of machining equipment. The jaws are jointly displaceable, toward and away from the axis of rotation, by a common control member such as a ring rotatable about that axis or shiftable therealong. Unsymmetrical stresses, with a correspondingly low operating efficiency, and/or bulky constructions are frequently encountered in conventional devices of this character.

OBJECTS OF THE INVENTION

It is, therefore, the general object of my present invention to provide an improved chuck of the type referred to which is of compact construction and highly efficient in operation.

A more specific object is to provide a three-jaw chuck of this character with positive guidance for the jaw supports and their control means over an extended stroke length to accommodate a wide range of stock sizes.

SUMMARY OF THE INVENTION

These objects are realized, pursuant to the present invention, by the provision of several (preferably three) angularly spaced, axially extending guide bores in the chuck body opening into respective radial slots for the guidance of a like number of jaw supports carrying gripper jaws which overhang a working face of that body, an advantageously bar-shaped driver being slidable in each guide bore and terminating in a camming head entering a mating recess in the associated jaw support. The recess has parallel camming surfaces, engaged by corresponding edges of the camming head, which slope toward the axis of rotation of the chuck body so that axial displacement of the driver results in a radial shifting of the jaw support; the several drivers are jointly shiftable by a control member, such as a sleeve, movable along the axis.

For positive guidance and avoidance of jamming, each driver may be provided with a pair of lateral ribs received in grooves which flank the associated guide bore, these grooves preferably terminating at a transverse plane which forms the rear boundary of the radial slots (i.e., the boundary remote from the working face). According to a more particular feature of my invention, wings received in flutes flanking the radial slots are carried on a relatively wide forward portion of the jaw support whose camming recess is formed on a relatively narrow rear portion thereof, these two portions meeting along the aforementioned transverse plane to form a pair of lateral shoulders which bear rearwardly upon internal lands of the chuck body adjacent the rib-guiding grooves. This allows the rear part of the chuck to be made solid so as not to be unduly weakened by the guide channels for the jaw drive as is the case with many conventional devices of this nature.

BRIEF DESCRIPTION OF THE DRAWING

The above and other features of my invention will now be described in detail with reference to the accompanying drawing in which.

DESCRIPTION OF PREFERRED EMBODIMENT

Figure 1:
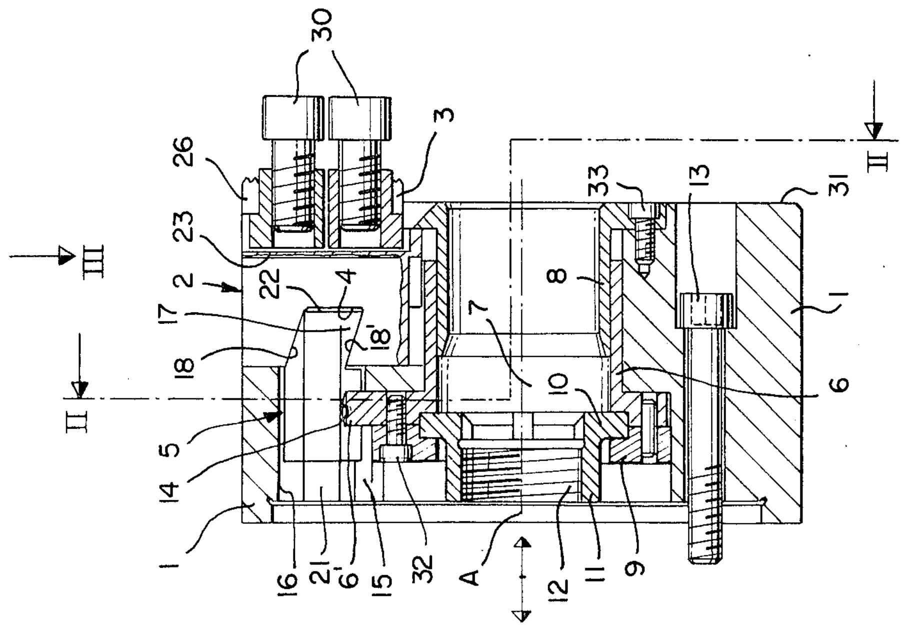
FIG. 1 is an axial section through a chuck according to the present invention.

The chuck illustrated in the drawing has a cylindrical body 1, centered on an axis A, in which three angularly equispaced jaw supports 2 are radially guided in radial slots 23 spaced 120° apart. Gripper jaws 3 overhanging a working face 31 are fitted into the slidable supports 2 to which they are secured by screws 30. Each support 2 has a recess 4 provided with camming surfaces 18, 18' which slope toward the axis A in the forward direction, i.e., toward the working face 31. Three bar-shaped drivers 5, one for each jaw support, are axially slidable in respective guide bores 16 opening into the slots 23; each driver 5 terminates at its forward end in a head 17 matingly received in the recess 4 of the associated support 2, the head 17 having outer and inner camming edges (as viewed in the radial direction) respectively engaging the surfaces 18 and 18'. Thus, a rearward shift of the drivers 5 from their limiting position shown in FIG. 1 results in an inward camming of the jaw supports 2 from their illustrated position near the periphery of chuck body 1.

Each driver 5 has a pair of lateral ribs 20 which slide in grooves 21 flanking the corresponding bore 16. The grooves 21, starting at the rear face of the chuck body 1, terminate at a traverse plane P in line with the rear edges of flutes 25 which flank the slots 23 and serve for the guidance of wings 24 integral with the jaw supports 2. Each of these jaw supports is divided into a forward portion 26, provided with the wings 24, and a narrower rear portion 27 formed with the camming recess 4; the two portions meet along the transverse plane P so as to form a pair of lateral shoulders 34 bearing upon internal lands of the chuck 1 adjacent the grooves 21 which orthogonally adjoin the flutes 25.

Though the guide bores 16 may be substantially circular in cross-section, the drivers 5 advantageously have a polygonal profile contacting the bore wall only within the grooves 21. A notch 14 near the rear end of each driver is engaged by a radial lug 6' of a control sleeve 6 slidably received in a throughgoing central aperture 7 of body 1 whereby the sleeve is positively coupled with the three drivers for joint axial displacement. Sleeve 6 is secured by a clamping ring 9 and screws 32 to a peripheral flange 10 of a nut 11 with internal threads 12 into which an operating tube (not shown) may be screwed, this tube being axially shiftable (e.g., by hydraulic means) to open or close the jaws 3 around a tool or a workpiece which may be centered on a spindle passing through that tube and the sleeve 6 as well as through a guide sleeve 8 which is fixedly secured to body 1 by screws 33.

The bores 16 communicate with the central aperture 7 of the chuck body 1 via three radial passages 15 traversed by the lugs 6', thereby holding the sleeve 6 against rotation. The heads 17 are undercut at the inner camming surfaces 18' so that the drivers 5 can be easily extracted from the bores 16, if necessary, whereupon they are readily detachable from the lugs 6' for possible replacement.

Figure 2:
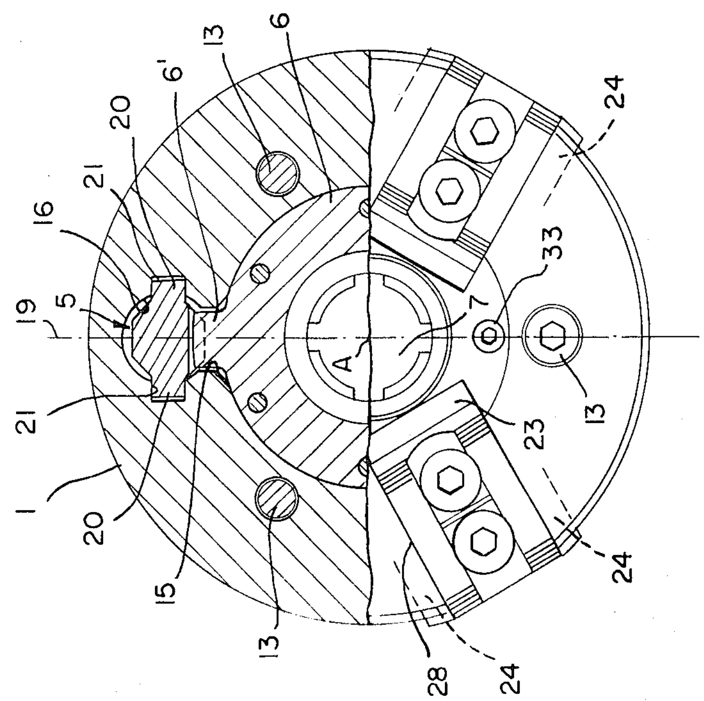
FIG. 2 is a partly sectional end view taken on the line II—II of FIG. 1.

It will be noted that each driver 5 is fully symmetrical about an axial plane 19 (shown in FIG. 2 for the uppermost driver) so that the camming acting of its head 17 does not give rise to any undesirable lateral stresses. The ribs 20 extend all the way to the front face 22 of head 17, to give maximum positive guidance to the driver 5 throughout its operating range in which the head 17 remains in engagement with the recess 4.

Bolts 13 are provided for the purpose of attaching the chuck body to a flange on a hollow drive shaft of a machine tool, e.g., a lathe.

Figure 3:
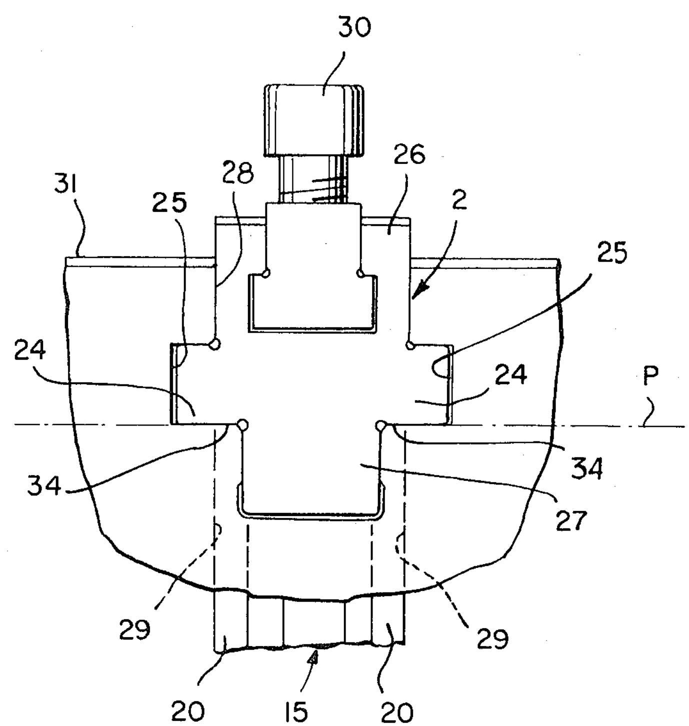
FIG. 3 is a fragmentary top view, as indicated by arrow III of FIG. 1, drawn to a larger scale.

As seen in FIG. 3, the lateral walls 28 of slots 23 are flush with the bottom surfaces 29 of the grooves 21 to simplify the machining of the chuck. From FIGS. 1 and 2 it will be noted that the channels for the jaw-driving machanism are located entirely behind the supports 2 so that a maximum area is available for the radial slots 23 and the central aperture 7.

I claim:

1. A chuck comprising a body centered on an axis of rotation, said body being provided with a plurality of angularly spaced radial slots and with a like plurality of axially extending guide bores opening into said slots; a plurality of jaw supports each radially slidable in one of said radial slots and provided with a recess confronting the respective guide bore, said recess having parallel camming surfaces sloping toward said axis; a plurality of generally bar-shaped drivers slidable in said guide bores, each of said drivers terminating in a head received in said recess of a respective jaw support and provided with sloping parallel camming edges engaging said camming surfaces for radially shifting the jaw support upon axial displacement of the driver, each of said drivers being provided with a pair of lateral ribs received in grooves flanking the associated guide bore; a control member movable along said axis in positive engagement with said drivers for jointly shifting all said jaw supports; and a plurality of gripper jaws respectively carried on said jaw support, said gripper jaws overhanging a working face of said body.

2. A chuck as defined in claim 1 wherein said grooves terminate at a transverse plane forming the rear boundary of said radial slots remote from said working face, said jaw supports having wings perpendicular to said ribs received in flutes flanking said radial slots, said flutes orthogonally adjoining said grooves.

3. A chuck as defined in claim 2 wherein each of said jaw supports has a relatively wide forward portion carrying said wings and a relatively narrow rear portion provided with said recess, said portions meeting along said transverse plane with formation of a pair of lateral shoulders bearing rearwardly upon internal lands of said body adjacent said grooves.

4. A chuck as defined in claim 1 wherein said ribs extend alongside said head to a forward face thereof proximal to said working face.

5. A chuck as defined in claim 1 wherein said grooves have bottoms flush with the sides of a respective radial slot.

6. A chuck as defined in claim 1 wherein said body has a throughgoing central aperture, said control member being slidably seated in said aperture and provided with a peripheral formation engaging in notches of said drivers.

7. A chuck as defined in claim 6 wherein said body is provided with axially extending passages between said aperture and said bores, said peripheral formation comprising a plurality of radial lugs traversing said passages and guided thereby for holding said control member against rotation.

8. A chuck as defined in claim 7 wherein said control member is a sleeve provided with an internally threaded extension remote from said working face.

* * * * *